UNITED STATES PATENT OFFICE.

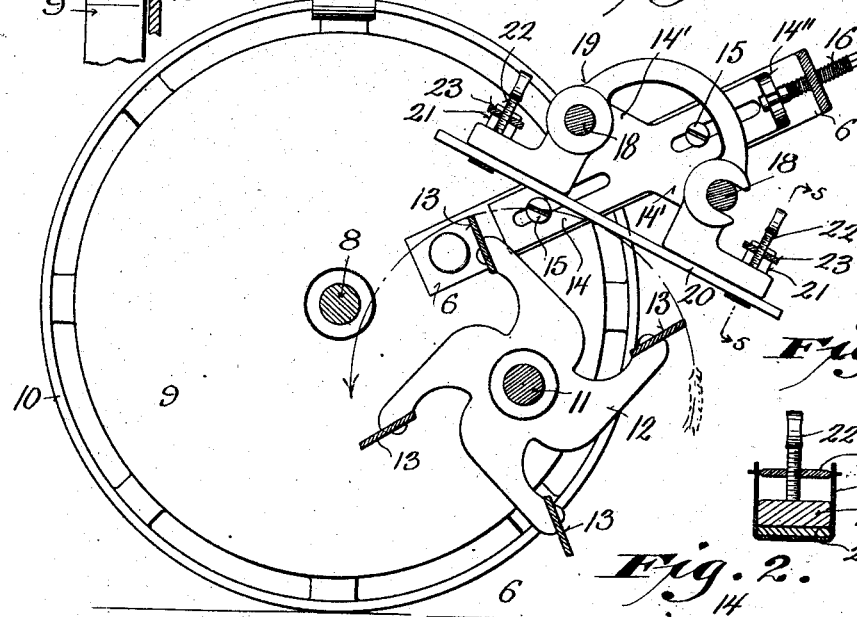

JOHN KELLING, OF MILWAUKEE, WISCONSIN.

LAWN-MOWER ATTACHMENT.

973,667.  Specification of Letters Patent.  Patented Oct. 25, 1910.

Application filed June 7, 1910. Serial No. 565,473.

*To all whom it may concern:*

Be it known that I, JOHN KELLING, a citizen of the United States, and resident of Milwaukee, in the county of Milwaukee and State of Wisconsin, have invented certain new and useful Improvements in Lawn-Mower Attachments; and I do hereby declare that the following is a full, clear, and exact description thereof.

My invention consists in what is herein particularly set forth with reference to the accompanying drawings and pointed out in the claims of this specification, its object being to provide lawn mowers with simple, economical and efficient attachments for sharpening the blades of same.

Figure 1 of the drawings represents a transverse sectional view of an ordinary lawn-mower and of an attachment in accordance with my invention applied thereto; Fig. 2, a plan view of a fragment of the mower and the attachment therewith partly broken and partly in section; Fig. 3, a rear elevation of a fragment of said attachment; Fig. 4, a sectional view of a fragment of the mower and of a portion of a detachable crank applied to a traction-wheel of said mower, and Fig. 5, a transverse section view on the plane indicated by line 5—5 in Fig. 1.

Referring by numerals to the drawings 6 indicates each of a pair of angular side-bars of the frame of an ordinary lawn-mower, 7 the handle to which said side-bars are rigidly secured, 8 the main-shaft, 9 a gear-case, 10 a traction-wheel, 11 the shaft that is driven from the one aforesaid, 12 one of the plates that are fast on the shaft 11, and 13 each of the blades that are secured to arms of said plates.

My attachment comprises a pair of longitudinally slotted plates 14 each provided with ears 14′ extending in opposite directions therefrom at a suitable angle midway of the extremities thereof, and said plates are adjustable on clamp screws 15 that extend through longitudinal slots of the same into longitudinal stretches of the side-bars 6 of the mower-frame. The rear end of each plate 14 is inturned at a right-angle to the remainder thereof and recessed to form a slotted flange 14″ of the same, and a headed journal end of an adjusting-screw 16 is loose in the slot of the flange. The threaded portions of the screws 16 engage rear transverse stretches of the mower-frame side-bars, and the rear ends of said screws are angular for the engagement of a wrench. Fast in inner studs 17 of the slotted plates 14 are rods 18, said plates and rods constituting an adjustable-frame.

In loose engagement with the rods 18 of the adjustable frame is a slide 19, the same being preferably outwardly bowed as herein shown to facilitate its grasp by an operator. The faces of the ends of the slide are angular, their inner faces being flat in opposition to a flat file 20 adjustably secured thereto by bands 21 and set-screws 22 engaging bearing plates 23 held in connection with said bands, as herein shown, or made integral parts of the same as may be preferred in practice, said screws being in opposition to said slide.

By adjusting the slide-carrying frame, the file is positioned to have contact with the edges of the blades 13 at the proper angle, and the slide 19 is moved along the guide-rods 18 of said frame to effect a sharpening of said blades, the mower being then canted, to have its traction-wheels out of contact with the opposing surface, and a driving crank 24 temporarily secured to one of said wheels that is fast on the main shaft 8. The shank of the crank herein shown is screw-threaded in a flange of a grip-plate 25 to be adjusted against the outer side of a traction-wheel of the mower with which the grip-plate is engaged, said plate being thus drawn tight on the rim of said wheel. The crank 19 is employed to drive the main shaft 8 when the mower is canted as aforesaid. The sharpening of the mower-blades having been effected, the slide-carrying frame is adjusted to have the file clear said blades, and the crank 24 detached.

One file will serve indefinitely, as the same is longitudinally adjustable in connection with the slide, and being worn out upon one side it may be readily reversed to bring its other side in opposition to the blades. It also follows that the file may remain in connection with the slide or be removed therefrom after each sharpening operation.

From the foregoing it will be understood that a lawn-mower provided with an attachment in accordance with my invention may be readily sharpened from time to time at the place of use and without taking the same apart.

I claim:

1. A lawn-mower attachment consisting of a frame comprising plates designed to be adjustably connected to the side-bars of the mower-frame longitudinally of the same and rods connecting the plates, a slide guided on the rods, and a file in connection with the slide to oppose the edges of the mower-blades at a predetermined angle thereto.

2. A lawn-mower attachment consisting of a frame comprising plates designed to be adjustably connected to side-bars of the mower-frame longitudinally of the same and rods connecting the plates, a slide guided on the rods, a file, and means for clamping the file to the slide in opposition to the edges of the mower-blades at a predetermined angle thereto.

3. A lawn-mower attachment consisting of a frame comprising plates designed to be adjustably connected to side-bars of the mower-frame longitudinally of the same and rods connecting the plates, a slide guided on the rods, a file, bands embracing the file and ends of the slide, plates in connection with the bands and set-screws extending through the latter plates in opposition to said slide, the file being in opposition to the edges of the mower-blades at a predetermined angle thereto.

4. A lawn-mower attachment consisting of a frame comprising plates provided with longitudinal slots, slot-engaging clamp-screws by which to hold the same in adjustable connection with the side-bars of the mower-frame and rods connecting the plates, a slide guided on the rods, and a file in connection with the slide to oppose the edges of the mower-blades at a predetermined angle thereto.

5. A lawn-mower attachment consisting of a frame comprising longitudinally slotted plates having inturned rear ends, adjusting screws in connection with said ends of the plates designed for engagement with transverse rear stretches of a mower frame, clamp-screws extending through the slots of said plates for engagement with side bars of the mower frame, rods connecting the aforesaid plates, a slide guided on the rods, and a file in connection with the slide to oppose the edges of the mower blades at a predetermined angle thereto.

In testimony that I claim the foregoing I have hereunto set my hand at Milwaukee in the county of Milwaukee and State of Wisconsin in the presence of two witnesses.

JOHN KELLING.

Witnesses:
EMIL DANKWORTH,
ARTHUR SCHADEWALD.